United States Patent
Niederjohn

[11] 3,771,012
[45] Nov. 6, 1973

[54] BATTERY PROTECTIVE CIRCUIT FOR EMERGENCY LIGHTING SYSTEMS

[75] Inventor: Wayne M. Niederjohn, Danville, Ill.

[73] Assignee: General Electric Company, Indianapolis, Ind.

[22] Filed: May 24, 1972

[21] Appl. No.: 256,251

[52] U.S. Cl. .................... 315/86, 307/64, 307/66, 320/37, 320/40, 323/50
[51] Int. Cl. ...................... H05b 37/04, H02j 9/00
[58] Field of Search ........................ 315/86, 87, 88; 307/64, 66; 323/50; 320/37, 39, 40

[56] References Cited
UNITED STATES PATENTS

| | | | |
|---|---|---|---|
| 3,684,891 | 8/1972 | Sieron | 315/86 |
| 3,447,060 | 5/1969 | Tedd | 320/40 |
| 3,182,249 | 5/1965 | Pahlavan | 323/50 |
| 3,573,541 | 4/1971 | Dunn et al. | 315/87 |

Primary Examiner—Roy Lake
Assistant Examiner—Hugh D. Jaeger
Attorney—David M. Carter

[57] ABSTRACT

This invention provides improved circuitry for holding an inverter of an emergency lighting system in an off condition until a normal power source falls below a predetermined voltage level and circuitry to protect a battery from deep discharges when it is called upon to deliver auxiliary power to a lighting system via said inverter. The protective circuitry includes the short circuiting of one of a plurality of windings of a transformer of the inverter upon the battery voltage falling below a predetermined level. The shorting of one winding causes the inverter, which includes other windings of the transformer, to cease oscillation, and therefore substantially cease to draw power from the battery. The battery can thereby recover in substantially unloaded condition, prolonging its useful life.

Means are provided for allowing the battery to repower the inverter when the battery has recovered sufficiently. This results in a cyclical operation of the emergency lighting system causing the lights to flash as the battery recovers and discharges. This recovery and discharge cycle prolongs the operating time of the lighting system when under emergency power and prolongs the life of the battery.

9 Claims, 1 Drawing Figure

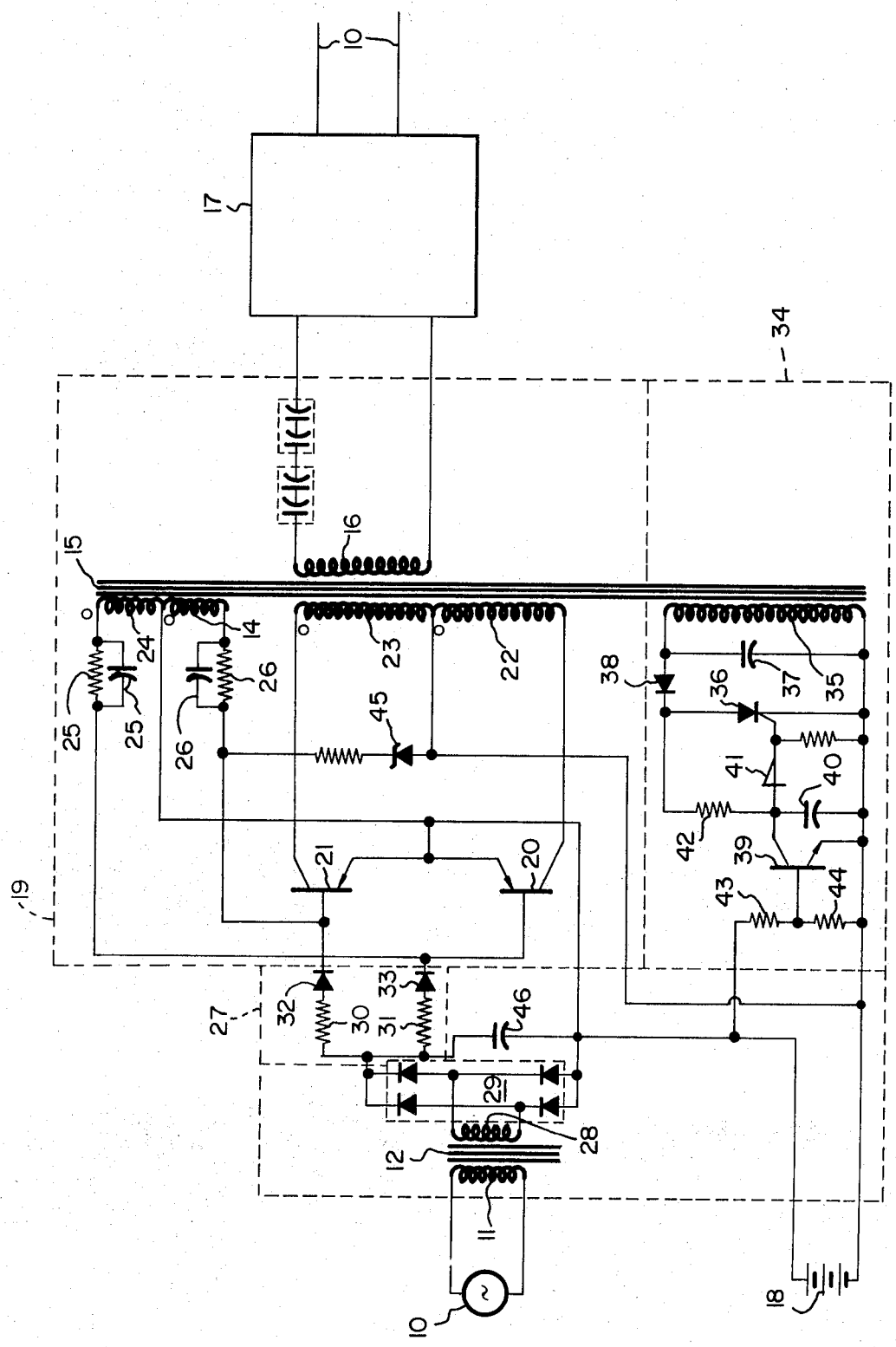

BATTERY PROTECTIVE CIRCUIT FOR EMERGENCY LIGHTING SYSTEMS

BACKGROUND OF THE INVENTION

The present invention relates to an emergency power system for arc discharge lighting systems whereby emergency energy is provided if the normal source of power fails. More particularly, the invention relates to improved circuitry for inhibiting an inverter forming a part of the invention from operating and protecting the auxiliary source of emergency power, typically a battery, from deep discharges.

During the period when a normal source of power is available, an improved inverter hold-off circuit is utilized for inhibiting the operation of the inverter and the delivery of power from the emergency source to the arc discharge lighting system.

When called upon to provide emergency power for such lighting systems, and with power being drained therefrom, batteries of course will slowly discharge. Deep discharge of a battery must be prevented since it is well known that this presents a problem in that it causes cell reversal within the battery and virtually assures the battery's destruction. Therefore, a means for protecting the battery from such deep discharges has been felt necessary in the prior art.

The foregoing problem of the prior art has been overcome by the improved circuitry of the invention and an arrangement has been provided by which the operational discharge of a battery is automatically discontinued when the voltage of the battery falls below a predetermined level thereby providing an opportunity for recovery of the battery. This circuit is further adapted to resupply power from the battery to the lighting system when the battery voltage has recovered to a predetermined higher level. This cycling of operation of the battery permits continuance of the operation of the emergency lighting system over a longer period than would otherwise be possible and without damage to the battery.

SUMMARY OF THE INVENTION

It is therefore an object of my invention to provide a new and improved emergency power system for arc discharge lighting systems.

It is a further object of my invention to provide a new and improved emergency power system using a battery and incorporating means for protecting the battery against deep discharges.

It is another object of the invention to permit utilization of a battery for an emergency power system over a greater total period of time without damage to the battery.

It is another object of the invention to incorporate and combine an improved inverter holdoff circuit emergency arc discharge lighting system to assure that the inverter does not become operative during a period when normal power is available for powering the arc discharge lighting system.

Briefly stated and according to one embodiment of the present invention, the foregoing objects among others are achieved by providing a control circuit including one winding of a transformer which transformer forms a portion of an inverter in the lighting system circuit.

The transformer includes a first and a second winding coupled to one another in the inverter oscillator circuit, and an output winding coupled to the load. An additional winding which may be in the form of a third winding for setting the oscillating frequency of the inverter is coupled to the first and second windings and to a control circuit which is capable of being short-circuited selectively at a predetermined battery level, to inhibit operation of the inverter, and in turn remove the inverter load from the battery and provide an opportunity for the battery to recover.

BRIEF DESCRIPTION OF THE DRAWINGS

This invention may be better understood by reference to the following detailed description of an embodiment thereof taken in conjunction with the accompanying drawing in which:

The single FIGURE is a diagram of an arc discharge lighting system incorporating the emergency power system of this invention.

DESCRIPTION OF A PREFERRED EMBODIMENT

In FIG. 1 there is shown a normal 60 Hz power source 10 which is utilized for supplying power to the lighting system of load 17 in a manner well known in the art. One circuit showing the manner in which a 60 Hz power source is connectable to an arc discharge lighting system, as well as the manner of interconnecting an emergency power unit to the arc discharge lighting system is disclosed in an application by Rollie Herzog filed May 24, 1972 for An Emergency Instant-Start Lighting System for Arc Discharge Devices and assigned Ser. No. 256,252 (Docket 58BD-6122).

In order to assure continued operation of the lighting system should there be a failure of the source 10, an alternate source of power is provided from a standby battery 18. The battery 18 supplies power to the load upon failure of source 10 through an inverter oscillating circuit 19 which converts the DC battery power to AC power for the load.

The inverter circuit includes two transistors 20 and 21 as active elements, and also includes windings 14, 16, 22, 23 and 24 of a transformer 15.

The positive terminal of the battery 18 is connected to the emitter of transistors 20 and 21. The negative terminal of the battery 18 is connected to the collector of transistor 20 through winding 22 and to the collector of the transistor 21 through winding 23. A feedback circuit for driving the base of transistor 20 is provided through winding 24 and RC circuit 25. Similarly, a feedback circuit for the base of transistor 21 is provided by winding 14 and the RC circuit 26. Power is supplied from primary winding 22 and 23 of transformer 15 through the output winding 16 to the load 17.

While the normal 60 Hz power source 10 is available it is, of course, not generally desired that the inverter circuit 19 also by supplying power to the load and a holdoff circuit 27 is provided to keep the inverter circuit inoperative under these normal conditions.

The holdoff circuit 27 includes a transformer 12 having a primary winding 11 through which the holdoff circuit receives power from the normal power source 10. The secondary 28 of transformer 12 couples this normal power source to a bridge rectifier 29, which develops a DC voltage across capacitor 46. This DC voltage is used to supply a bias voltage to the bases of transistors 20 and 21 through resistors 30 and 31 and diodes 32 and 33 so as to maintain the transistors 20 and 21 off while normal power source 10 supplies power to the load 17. Diode 32 and resistor 30 form a series circuit for biasing the base of transistor 21. Similarly, diode 33 and resistor 31 form a series circuit for biasing the base of transistor 20. Should, however, power source 10 fail, the DC voltage developed by the bridge rectifier will not be sufficient to hold transistors 20 and 21 off, and the inverter will operate to provide power from battery 18 to load 17.

If the normal power source should be unavailable for a prolonged period of time and power is drawn from the battery, the battery could be discharged to such an extent that it would be permanently damaged. For example, if the battery is allowed to suffer a deep discharge, cell inversion may take place. In accordance with this invention, a drop-out circuit 34 is provided which renders the inverter circuit 19 inoperative and prevents further drain of the battery when the battery voltage has dropped to a predetermined level. This predetermined level is chosen so that it is at a voltage which is above that at which deep discharge and permanenet damage to the battery would occur.

The drop-out circuit 34 effects discontinuance of operation of the illustrative inverter circuit 19 by shorting a tuning winding 35 of transformer 15 when the battery voltage drops to the predetermined level.

When the winding 35 is short-circuited by the switching on of a controlled rectifier, which, in the specified embodiment shown, is a silicon controlled rectifier 36, the voltages across all the windings of transformer 15 will drop. The drop in voltage of the winding, either 22 or 23, in series with the transistor that is conducting at the time, either 20 or 21, will tend to allow more current to flow. At the same time, the base drive to the conducting transistor is reduced because the voltage of the winding, either 14 or 24, is reduced. As a result, the conducting transistor is forced out of saturation thereby inhibiting inverter operation. The shorting means also reduces the energy stored in the inverter sufficiently to stop oscillation.

Referring more specifically to the drop-out circuit 34, the tuning winding 35 has a capacitor 37 shunted thereacross. The controlled rectifier or SCR 36 is connected in series with a diode 38 with this series circuit being further connected across the winding 35. The SCR 36 is normally open circuited. The gating of SCR 36 to render the SCR conductive and thereby to short the winding 35 is controlled by means of a circuit including a transistor 39 and a capacitor 40. The collector of the transistor 39 is connected to the gate of the SCR 36 through a silicon unidirectional switch 41. The collector of transistor 39 also is connected to the junction of the anode of SCR 36 with the cathode of diode 38 through a resistor 42. The emitter of transistor 39 is coupled to the cathode of SCR 36. The base of transistor 39 is connected to the battery 18 by means of a voltage divider formed by resistors 43 and 44. The values of the resistors 43 and 44 are chosen to predetermine the voltage level of the battery at which the drop-out circuit 34 will become effective to discontinue operation of the inverter circuit 19. The transistor 39 is normally operated in a saturated condition thereby shorting and preventing the charging of the capacitor 40. However, when the voltage of the battery 18 drops to the predetermined level, transistor 39 is brought out of saturation, thereby permitting the charging of capacitor 40. The charging of capacitor 40 gates the SCR 36, shorting the winding 35 and discontinuing operation of the inverter circuit 19.

Shorting of winding 35 removes the inverter circuit load from the battery and permits the battery to recover. In order to permit reinitiation of the operation of the inverter circuit when the battery has recovered to an extent that its voltage rises to a predetermined higher level, a further circuit is provided in accordance with this invention. This circuit includes a voltage breakover device which, in the specific embodiment shown, is a Zener diode 45 for completing the circuit including the battery 18 and inverter circuit 19. When the battery voltage reaches the breakover voltage of a device such as a Zener diode 45, a circuit is completed through the Zener diode 45 to the base of transistor 21 to reinitiate operation of the inverter circuit 19.

If the battery again falls to the predetermined level sufficient to initiate the operation of the drop-out circuitry 34, the inverter will again be turned off until such time as the battery may recover again to the Zener breakover level.

This cyclical behavior of the system causes the lamps to flash in accordance with the operation and dropping out of the inverter circuit. This indicates that the battery power is becoming exhausted.

The operation of the emergency power system of the invention is as follows. Under normal operation, the lighting system receives its power from the normal source 10 of alternating current power in a manner well known in the art. The normal source of power 10 is also coupled through transformer 12 to a full wave rectifier 29 which supplies a DC voltage to resistors 30 and 31 which bias the inverter circuit transistors 20 and 21 in the off position.

If the power from source 10 becomes unavailable, emergency power is immediately supplied from the battery 18 through the inverter circuit 19. Upon failure of the normal power source 10, the DC output of full wave rectifier 29 becomes unavailable to bias transistors 20 and 21 in the off position and these transistors begin to operate, producing a voltage at windings 22 and 23. These windings couple the inverter circuit output through secondary winding 16 to the load 17. Power is now supplied through the inverter circuit from the battery 18 under these conditions.

Since it is now under load, battery 18 will begin to discharge. If this discharge continues over too long a period of time, the battery could be subjected to deep discharges which could cause cell reversal and battery destruction. However, in accordance with this invention, when the voltage level of battery 18 drops below the predetermined level determined by the selection of voltage divider resistors 43 and 44, transistor 39 is brought out of saturation and capacitor 40 is allow to charge.

As capacitor 40 charges, a voltage is applied to the gate of SCR 36. When this voltage is sufficient to fire the SCR, the winding 35 of transformer 15 is short-circuited. This causes inverter circuit 19 to cease operation. When the inverter ceases operation, it no longer presents a load on the battery 18.

Once there is no inverter load on the battery 18, the battery is allowed to recover. When the battery 18 has recovered to a voltage level sufficient to overcome the breakover voltage of Zener diode 45, the inverter circuit again begins operation, turning the lamps back on. When the battery has discharged again to thee predetermined level, the drop-out circuit 34 operates as described above to shut off the inverter circuit. The battery is then again under a no inverter load condition and is able to recover.

A cyclical on-off lamp operation results from the above starting and stopping operation of the inverter circuit, causing the lamps to burn intermittently. This gives an indication to the user that the battery discharge is approaching an unacceptable level. Moreover, by this arrangement, the emergency power system may be operated over a longer total time than would otherwise be possible and still without damage to the battery.

It has thus been shown that, by providing a holdoff circuit for an inverter and a drop-out circuit of the type described in conjunction with an emergency power system for operating arc discharge lamps, deep discharges of the battery and hence the destruction of the battery may be prevented, and emergency lighting may be provided for a longer period of time.

While a specific embodiment of this invention has been described and shown above, it will be readily apparent to those skilled in the art that modifications are possible without departing from the inventive concepts embodied herein. The invention therefore should not be limited or restricted except as is necessary by prior art and by the spirit and scope of the appended claims.

What is claimed as new and desired to be secured by Letters Patent of the United States is:

1. A lighting system including means for developing emergency power for said lighting system from a battery upon failure of a normal power source for powering said lighting system,
    said means for developing emergency power for said lighting system from said battery comprising an oscillator circuit including a plurality of transformer windings, and
    means for controlling said oscillator circuit,
    said means for controlling said oscillator circuit comprising means for shortcircuiting one of said plurality of transformer windings to inhibit oscillation of said oscillating circuit when the voltage of said battery drops to a predetermined voltage level.

2. A lighting system as set forth in claim 1 wherein said means for short-circuiting one of said plurality of transformer windings comprises:
    a switching device effectively connected across said one of said plurality of transformer windings and having a conductive and a non-conductive state, said switching device being in said non-conductive state when the battery is above a predetermined level, and said switching device being in said conductive state when said battery is at or below said predetermined level.

3. A lighting system as set forth in claim 1 including means for inhibiting said oscillator circuit prior to failure of said normal power source.

4. A lighting system including means for developing emergency power for said lighting system from a battery upon failure of a normal power source for powering said lighting system,
    said means for developing emergency power for said lighting system from said battery comprising an oscillator circuit,
    means including a tuning winding for controlling said oscillator circuit, and
    means for short-circuiting said tuning winding to inhibit oscillation of said oscillator circuit when the voltage of said battery drops to a predetermined voltage level.

5. A lighting system as set forth in claim 4 wherein said means for short-circuiting said tuning winding comprises:
    a first switching device, said first switching device being conductive when said battery has a voltage level above said predetermined level and being non-conductive when the voltage of said battery drops to said predetermined level, and
    a second switching device connected across said tuning winding and coupled to said first switching device, said second switching device being non-conductive when said first switching device is conductive, and being conductive when said first switching device is non-conductive,
    said tuning winding being short-circuited upon said second switching device being rendered conductive whereby the oscillation of said oscillator circuit is inhibited.

6. A lighting system according to claim 5 wherein said first switching device is a transistor and said second switching device is a silicon controlled rectifier.

7. A lighting system according to claim 5 including means for reinitiating oscillation of said oscillator circuit when said battery has recovered to an extent that its voltage has reached a second voltage level higher than said predetermined voltage level.

8. A lighting system according to claim 7 wherein said means for reinitiating oscillation is a voltage breakover device.

9. A lighting system according to claim 8 and wherein said voltage breakover device is a Zener diode.

* * * * *